A. H. EMERY.
TESTING MACHINE.
APPLICATION FILED JAN. 28, 1909.

918,488.

Patented Apr. 13, 1909.
7 SHEETS—SHEET 3.

Witnesses

Inventor
Albert H. Emery,
By Knight Bros
Attorneys.

A. H. EMERY.
TESTING MACHINE.
APPLICATION FILED JAN. 28, 1909.
918,488.
Patented Apr. 13, 1909.
7 SHEETS—SHEET 4.
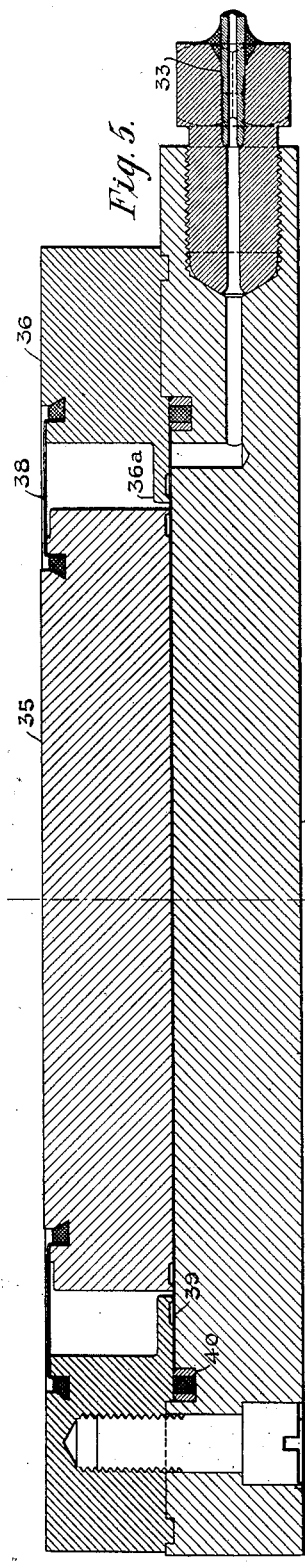
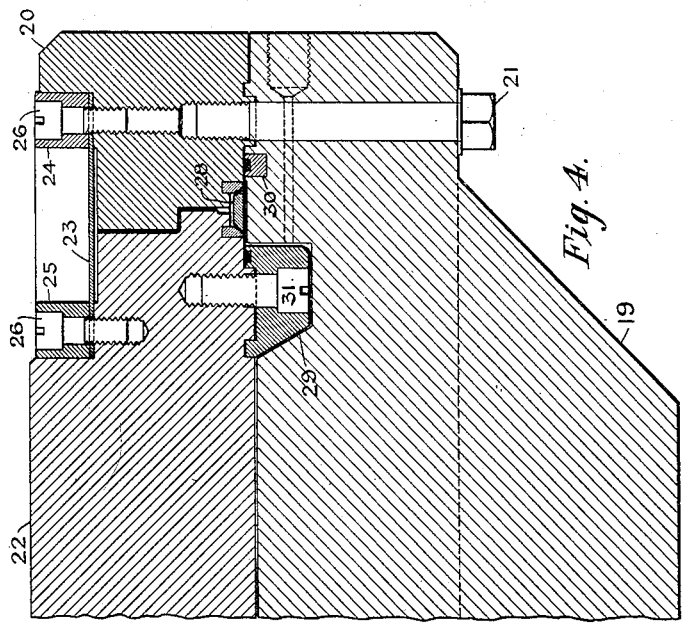
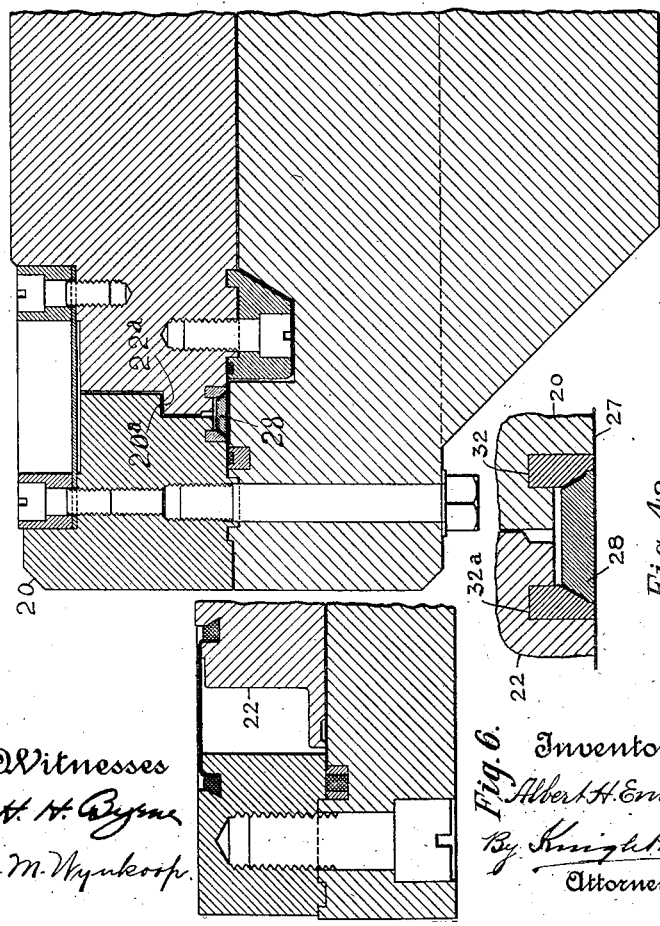
Witnesses
H. H. Byrne
J. M. Wynkoop
Inventor
Albert H. Emery,
By Knight Bros
Attorneys.

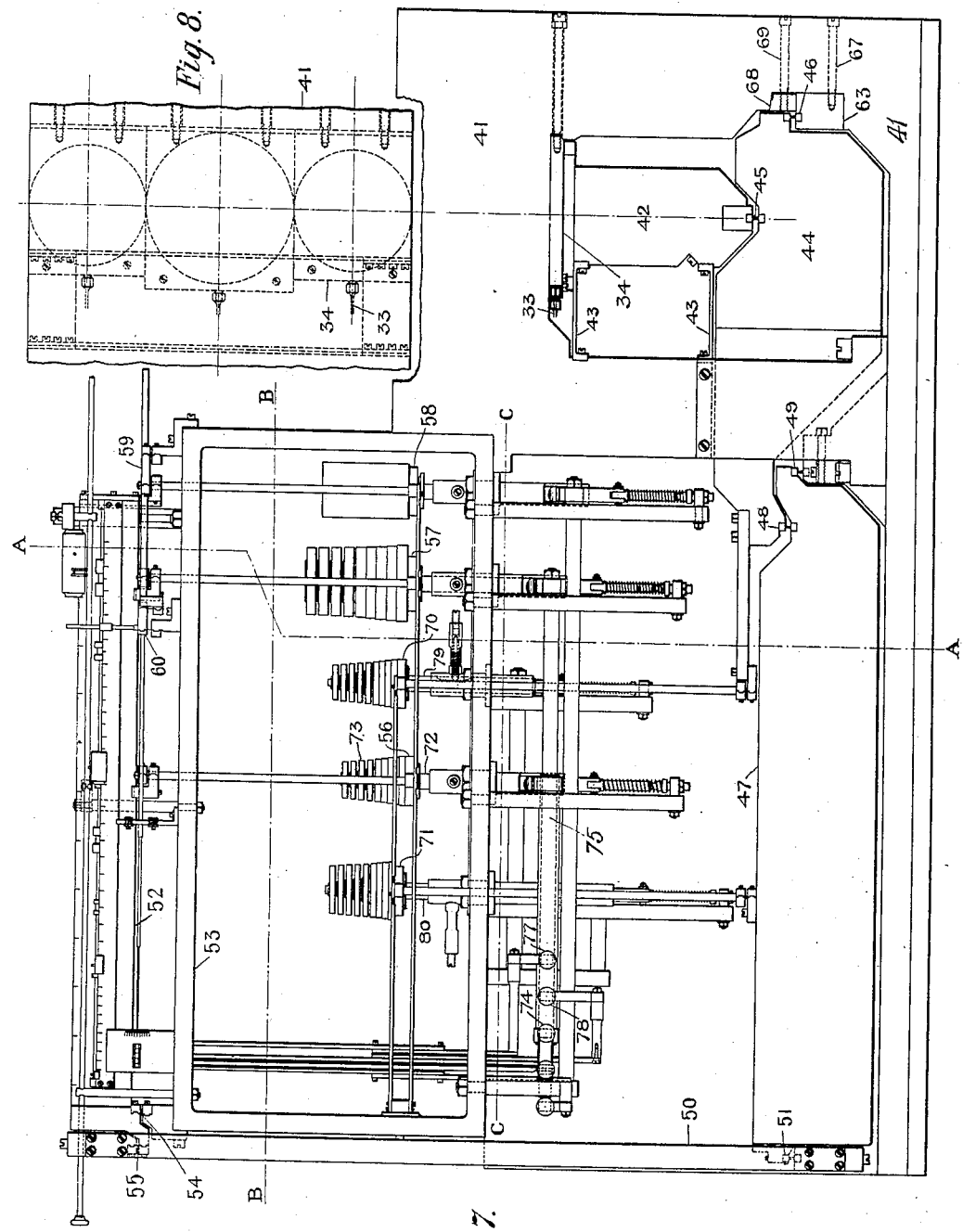

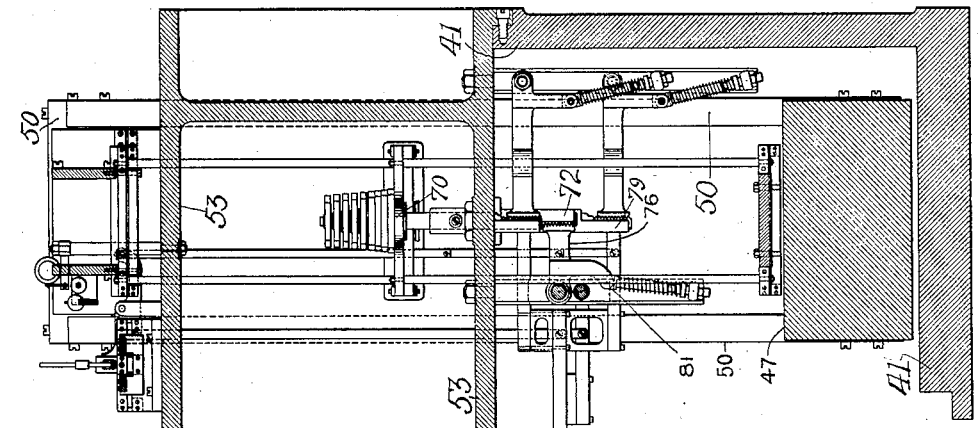
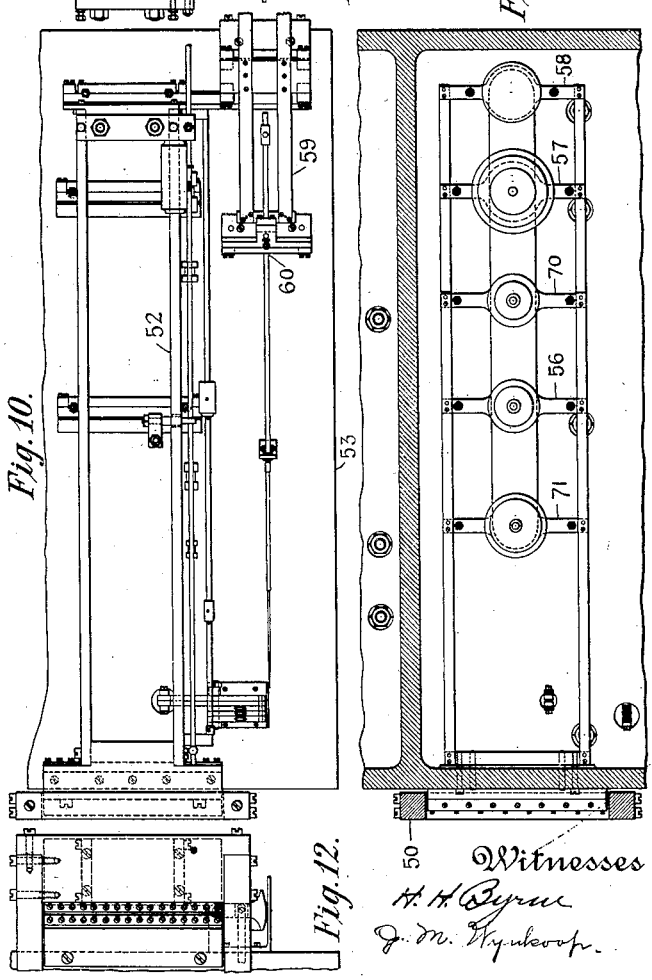
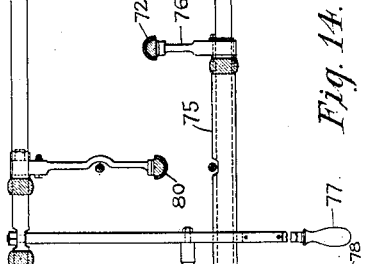
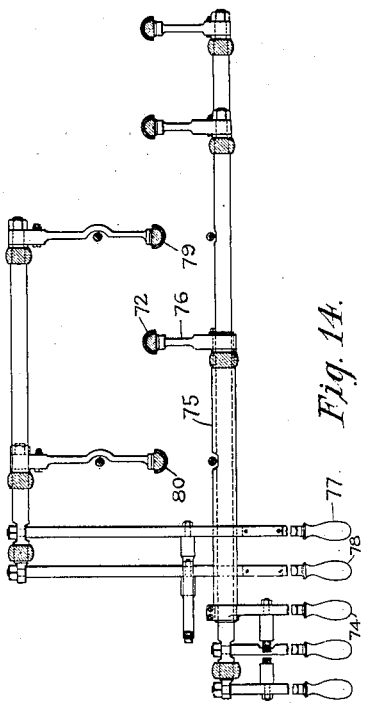

A. H. EMERY.
TESTING MACHINE.
APPLICATION FILED JAN. 28, 1909.
918,488.
Patented Apr. 13, 1909.
7 SHEETS—SHEET 7.
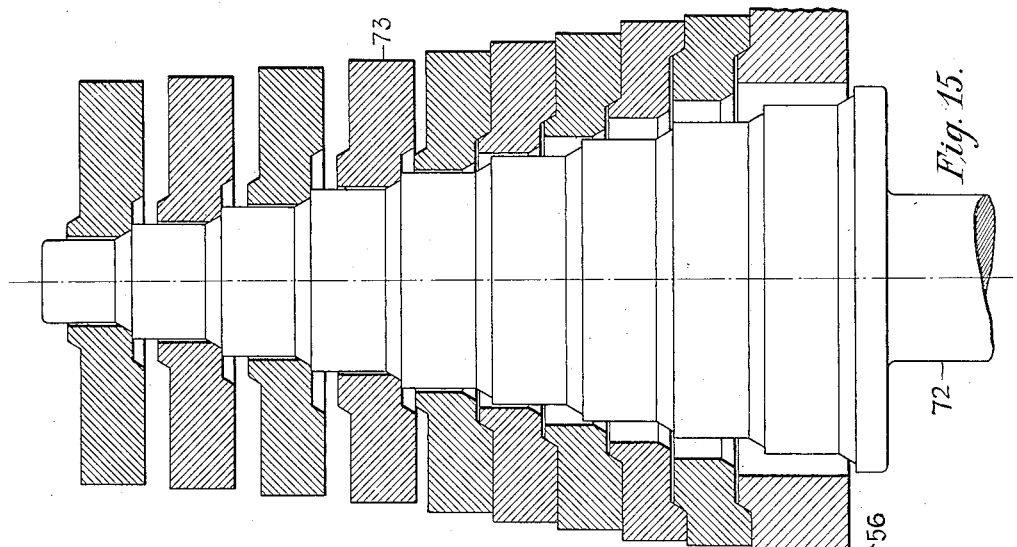
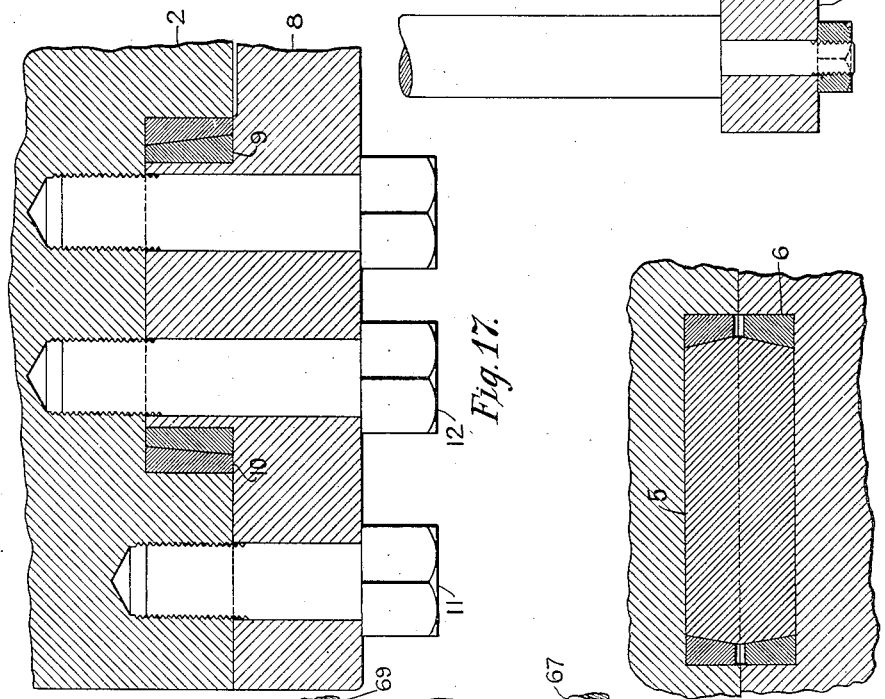
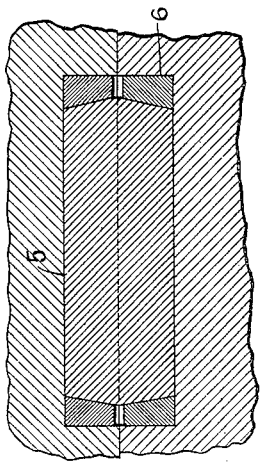
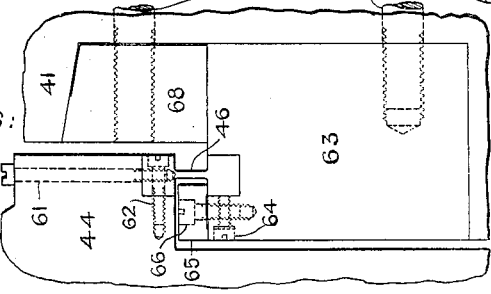
WITNESSES:
H. H. Byrne
J. M. Wynkoop
INVENTOR,
Albert H. Emery,
BY Knight Bros.
ATTORNEYS.

UNITED STATES PATENT OFFICE.

ALBERT H. EMERY, OF STAMFORD, CONNECTICUT.

TESTING-MACHINE.

No. 918,488.  Specification of Letters Patent.  Patented April 13, 1909.

Application filed January 28, 1909. Serial No. 474,745.

*To all whom it may concern:*

Be it known that I, ALBERT H. EMERY, a citizen of the United States, residing at Stamford, in the county of Fairfield and State of Connecticut, have invented certain new and useful Improvements in Testing-Machines, of which the following is a specification.

My invention relates to testing machines in which the load on the specimen is transmitted to a hydraulic support which is connected with a smaller support in a scale which weighs the load from this smaller support.

My invention relates in particular to the construction of the testing machine so as to transmit the load on the specimen to the scale support or supports without loss by friction and without tilting the column of the support; to the construction of the supports and to the scale for weighing the load from the smaller supports.

My invention is illustrated by 19 figures of 7 sheets of drawings of which:—

Figure 1:
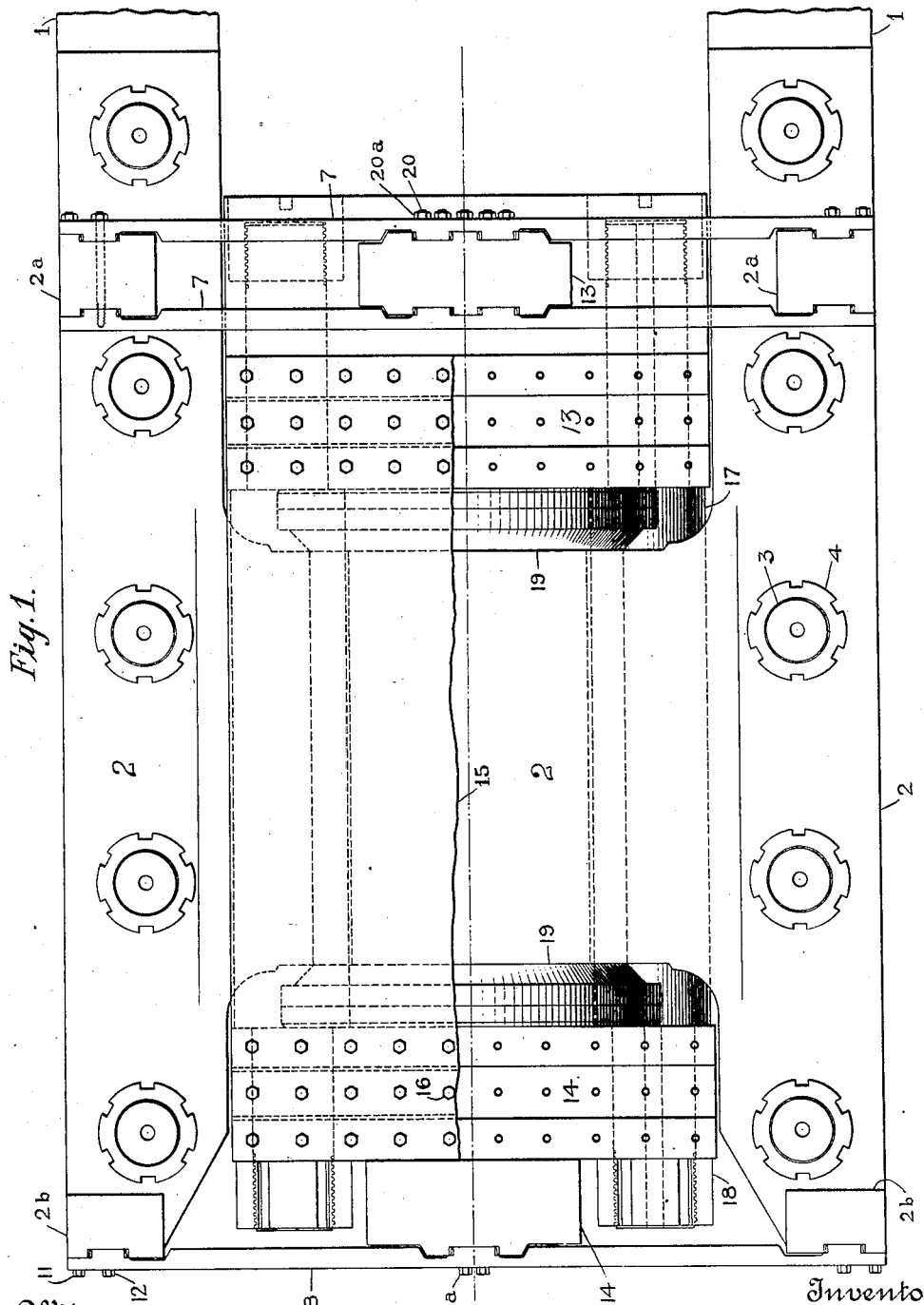
Figure 2:
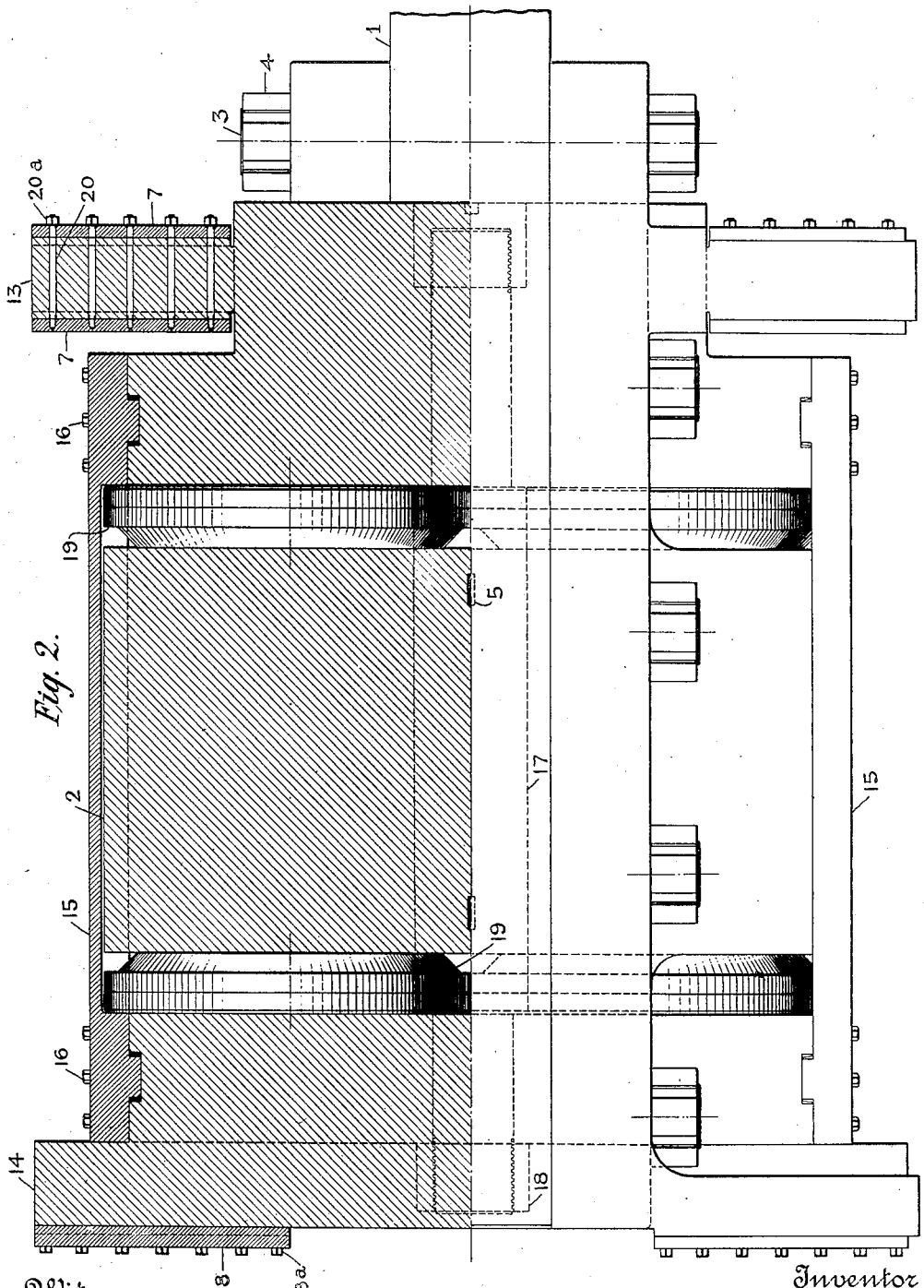
Figure 3:
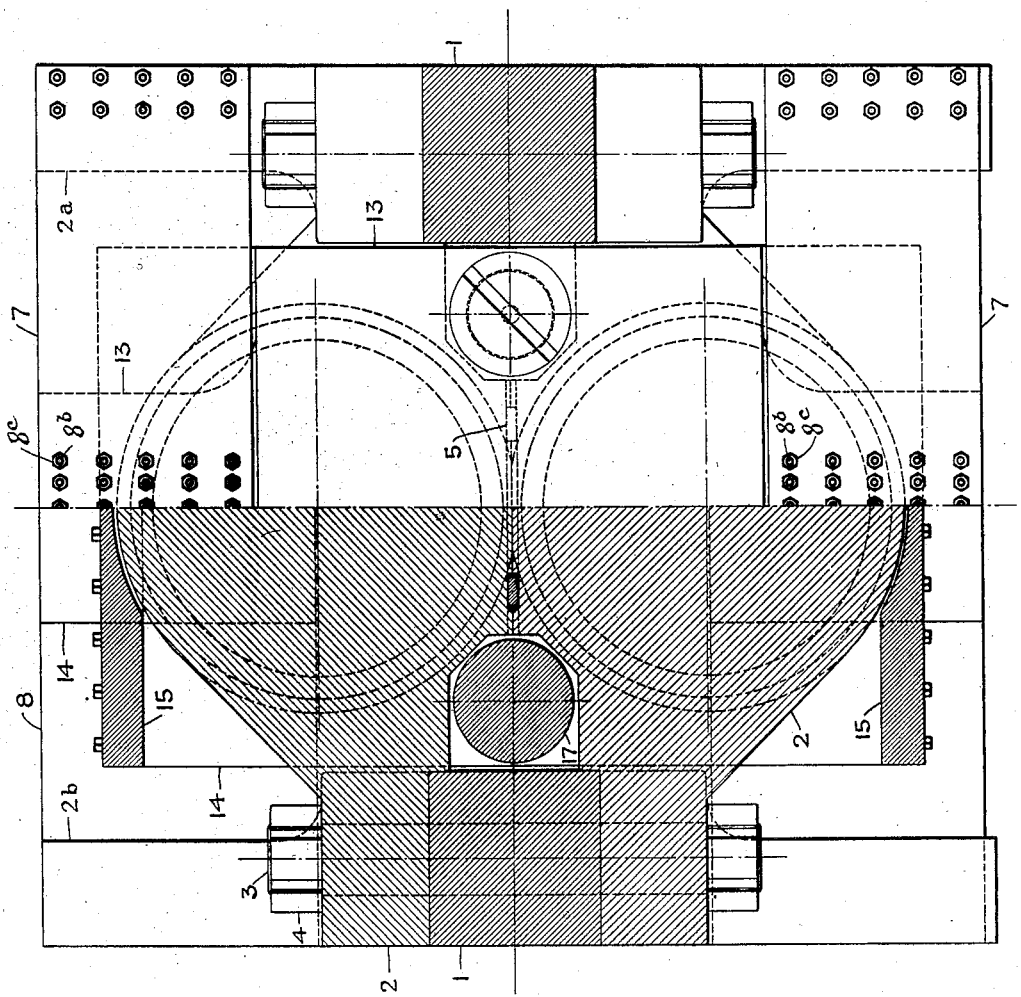

Figure 1 is the plan of the scale end of a testing machine, with part of the upper cover plate removed to show the supports: Fig. 2 is a side elevation of the scale end of the testing machine shown in plan in Fig. 1, the upper half of the figure, with the exception of the supports, being in section: Fig. 3 is an end view of the same, the whole left half and the side member which connects the scale and straining ends of the machine on the right being in section; Fig. 4 shows a section of the parts of one of the hydraulic supports shown in Figs. 1, 2 and 3, showing the details of its construction. Fig. 4ª shows, on a larger scale, a section of the bridge ring, etc., shown in Fig. 4. Fig. 5 shows a section of one of the smaller hydraulic supports used in the scale case in connection with the support shown in Fig. 4: Fig. 6 shows a detail of a support with a construction similar to that shown in Fig. 5, when the support is used as a receiving support: Fig. 7 shows a side elevation of the scale for weighing the load transmitted to the small hydraulic supports therein: Fig. 8 is a plan of a part of the scale showing the arrangement of the small hydraulic supports: Fig. 9 is a sectional end view of the scale, the section being taken on the line A—A on Fig. 7: Fig. 10 shows a partial plan of the scale shown in Figs. 7 and 9: Fig. 11 shows an end view of that part of the scale shown in Fig. 10. Fig. 12 shows an end view of the other end of that part of the scale shown in Fig. 10. Fig. 13 shows a partial sectional plan of the scale, the section being taken on the line B—B on Fig. 7. Fig. 14 shows another partial sectional plan of the scale to show the handles for moving the poise weights of the scale, the section being taken on the line C—C Fig. 7: Fig. 15 shows a set of the poise weights of the scale and illustrates the method of putting them on and off the scale pans: Fig. 16 shows a detail of one of the fulcrum plates of the scale: Fig. 17 shows a detail of one of the one wedge clamping joints between the parts of the testing machine: Fig. 18 shows a detail of one of the double wedge dowel plates in the testing machine.

My invention is more fully described in the following specification in which 1, see Figs. 1, 2 and 3, are side members which connect the straining end of the machine to the support or weighing end and carry loads of tension when the specimen is in compression and of compression when the specimen is in tension. Connecting these two ways is a very rigid beam 2, which may be a single casting or may be made in two parts for ease of manufacture. This beam is channeled or formed with longitudinal extensions on the sides to embrace the ways and it is secured to them by bolts 3 and nuts 4. If the beam is made in two pieces these bolts also secure the two pieces together. To insure the two parts always having the same relative position the dowel plates 5 are used, two running crosswise of the beam and two lengthwise. These pieces are made in the form of a double truncated wedge, see Fig. 18 and they fit in wedge shaped seats in the two pieces they are to dowel together. For accuracy and ease of machining these seats are preferably made with parallel sides and lined with wedges 6 which should be made of different material from the seat or the truncated wedge, then if the double truncated wedge is polished and the lining wedges 6 are of a softer material, the parts can be put together very accurately and with very little friction.

At or near the ends of the side extensions of the beams 2, see Fig. 1, are vertical projections 2ª and 2ᵇ, similar on the two sides of the beam and six stay plates 7 and 8 extend across the machine and are fastened to the extensions of the beams by wedge clamping joints. This joint might be simply a wedge shaped projection on one piece and a similar recess in the other with bolts to draw the projection into the recess but a preferable form is shown in Fig. 17 between the stay plate 8 and one of the projections on the beam 2. This joint is formed by a parallel-sided projection on the plate and a parallel-sided but wider projection in the beam, with two pair of wedges, 9 and 10, between the sides of the projection and the recess, the recess being slightly deeper than the height of the projection. The bolts 11 and 12 draw the projection into the recess and if the wedges are made of different materials and polished to decrease the friction, the two parts can be clamped together with great strength and firmness and all play or backlash eliminated, this being very essential in a machine of this character.

In Figs. 1, 2 and 3, 13 and 14 are the two loading platforms on opposite sides of the beams 2 and connected to them by the stay plates 7 and 8. The platform 13, toward the straining end of the machine, receives the load from the specimen and if this be a load of compression it transmits it directly to the hydraulic support between it (13) and the beam 2. This platform 13 is connected to the platform 14 by the two cover plates 15, fastened to the platforms by bolts 16 and by wedge clamping joints similar to those described and illustrated in Fig. 17. Platforms 13 and 14 are connected also by the two shouldered bolts 17 and nuts 18, the whole forming a very heavy yoke around the beam and supports so that loads of tension on the specimen, transmitted to the platform 13 by some form of holder, are transmitted to the platform 14 with very little spring of parts and without backlash. The platforms 13 and 14 are both provided with vertical extensions above and below, corresponding in position with those on the extensions of the beams 2, and to these the stay-plates 7 and 8 are fastened by bolts 8ª, and studs 8ᵇ, and nuts 8ᶜ, with clamping joints similar to those already described. For flexibility these stay-plates are made thinner near the clamping joints. They carry the weight of the platforms 13 and 14, the cover plates 15, bolts 17 etc., and allow the platforms to move longitudinally of the machine for the short distance required with perfect elastic action and without friction, but do not allow them to move in any other direction except very slightly from spring of parts when the load is one of compression and is out of the center of the platform, causing a longitudinal load to come on the stay-plates giving compression in one half of the length of the plate and tension in the other: the changes of lengths therefrom allowing a transverse motion of the platform equal to the extension or compression of the plate. The plates are made thick and wide to reduce all transverse motion and then necked down near the clamping joints to decrease the load required to move the platforms longitudinally of the machine. These stay-plates give an elastic resistance to the loads on the specimen which is allowed for in the rating of the scale. The ends of the shouldered bolts 17 are provided, outside the shoulders, with holes so they can be heated up while the nuts 18 are being tightened, providing a method of getting the platforms to bear solidly against the shoulders on 17.

Between the platforms 13 and 14 and the beams 2 are hydraulic supports 19. There may be a single support on each side of the beam or there may be two as shown, the load on the specimen being transmitted to the supports without friction. The construction of one of these supports is seen in Fig. 4 where 19 is the base of the support and 20 the casing ring, fastened to the base by screws 21. The column 22 fits within the casing ring with clearance all around and is connected to it by the annular stay-plate 23, clamped in position by rings 24 and 25 and screws 26.

In making a closed chamber for liquid between the base 19 and the column 22 I have heretofore used a thin diaphragm which covered the annular space between the column 22 and the casing ring 20, but this diaphragm needs to be thin to permit axial motion of the column and it sometimes breaks under heavy hydraulic pressure even with slight motion of the column and this permits the liquid to leak out and allows the pressure column 22 to rest directly on the base 19. To avoid the breaking of this diaphragm 27, see Fig. 4ª, I increase the annular space between the column 22 and the casing ring 20 and bridge or cover it with a bridge ring 28, which supports the diaphragm. This great increase of width and the use of the bridge ring permits a very considerable motion of the column without injury of the diaphragm. This whole construction permits an axial motion of the column 22 with reference to the base and casing ring without friction and without change of form of the cross section of the annular bridge ring 28, undue motion when filling and handling being prevented by the shoulders 22ª and 20ª on the exterior of the column and the interior of the casing ring respectively. The thin diaphragm 27 covers the bridge ring and extends under the clamping ring 29 and under the packing ring 30 and when the bolts 31 and 21 are tightened up the diaphragm 27 is sealed against the casing ring at its outside edge and against the column 22 at its inner edge and as the packing ring 30 also seals in the base 19 this annular diaphragm 27 with the column 22 and the base 19 form a closed chamber. If this chamber be filled with liquid till the column is held away from the base any axial load that comes upon the column will be transferred without frictional loss to the liquid. The bridge ring 28 might be simply an annular flat plate resting at its edges in recesses in the column and casing ring, but I prefer to make it of the form shown in Fig. 4ª, where it has thin edges and a relatively thicker central portion and where recesses are provided in the outer edge of the column 22 and the inner edge of the casing ring 20 to receive bearing rings 32, and 32ª which should be of a harder material than the column and casing ring and by using a hard material for the bridge ring, the bearing surfaces between it and the bearing rings 32, and 32ª can be made small and yet sustain the large pressure of the liquid on this bridge ring. This construction permits of the use of a thin diaphragm, as its unsupported width is very small or practically nothing at all and at the same time a relatively large motion of the column with reference to the base causes but a small deformation of the diaphragm with no permanent set therefrom.

When the load on the specimen is one of compression the load is transmitted directly through platform 13 to the supports and the only motion of the column 22 is that caused by the spring of parts, the compression of the liquid and by the flow of a small amount of liquid from the support to the support in the weigh case, the motion of the platform causing a bending of the stay-plates which is entirely elastic and frictionless and the small motion of the column relative to the base of the support causing a bending of the annular diaphragms 23 and 27 which is likewise elastic and frictionless. When the load is one of tension the stretching of the cover plates 15 and the bolts 17 gives a greater motion to the platform 13 than occurs for an equal load of compression, this causes an increased bending of the stay-plates 7 which reduces the load transmitted to the platform 14 but this can readily be corrected for in the supports of the scale used for weighing the hydraulic pressures or can be corrected for by making the acting area of the supports that take the tension loads slightly smaller that the acting area of the supports taking the compression loads so that the same load on the specimen will give the same load per square inch on the liquid in the supports for either tension or compression. Each of these supports 19 is connected by pipes 33 with a similar but smaller support 34, (Fig. 7) in the weight case and by weighing the load they give and knowing the relative areas, the load on the specimen is known very accurately. As the loads of tension are always axial or so very nearly so that the load is carried by the two tension supports is the same on each, they can be connected together, but for compression the loads on the two supports may be quite different as the load may not be central on the platform and each one must have its own small support or chamber in the weigh case. These small supports or chambers 34 I prefer made in the form shown in Fig. 5. This chamber is connected with its support by a small pipe 33, and when the load comes on the support putting pressure on the liquid, the liquid tends to flow from the support to the chamber and force it to open. The chamber is made with a base 34, column 35, casing ring 36 fastened to the base by screws 37, an annular stay-plate 38 and a circular diaphragm 39 which extends over the packing ring 40. When the screws 37 are tightened this diaphragm is held very tightly against the packing ring 40 and with the base 34 forms a closed hydraulic chamber. The space that this diaphragm has to span between the casing ring 36 and the column 35 must be small to enable the diaphragm to support the hydraulic pressure and as this free span is small the motion of the column with reference to the base must be very small or the diaphragm will very soon fail to carry the hydraulic pressure.

When pressure from the large supports is transmitted to the weighing chamber it causes yielding of the parts which support this chamber and resist its tendency to open, which yielding permits the column to move away from the base a slight distance and this changes the shape of the diaphragm in its free span and this change causes a difference in the action of the chamber under different pressures. That is, as the pressure increases and the column moves away from the base, the same increase of pressure per square inch on the liquid gives less increase of load on the column. To avoid this change of action as the load increases I provide the inner edge of the casing ring 36 with an inwardly extending lip 36ª, its length and thickness being so proportioned that its bending upward for any given hydraulic load in the chamber is very nearly equal to the motion of the column away from the base due to spring of parts for that load. This motion is determined by the construction of the parts between which the chamber is located, and, by the use of this lip, a very much greater motion can be allowed with trouble resulting therefrom. This same construction is applicable to a platform or receiving support but in this case as the motion of the column is toward the base for increase of load, the position of the lip has to be changed as shown in Fig. 6, the lip extending outwardly from the column 22.

In order to measure the load on the specimen it is necessary to know the ratio of the acting areas of the supports that receive the load to the acting areas of the chambers connected therewith and then to measure the exact load which is necessary to keep the column from moving away from its base. For this I prefer to use a scale of the form shown in Figs. 7 to 16 inclusive. This consists essentially of a rigid frame or housing casting against which the bases of the chambers rest and a system of levers and weights which resist and balance the loads from the columns of the chambers. Fig. 7 shows such a system with a housing casting 41, a load column 42 and the chambers between the housing casting and the load column with their bases 34 resting against the housing casting 41. This load column 42 is firmly secured against all but longitudinal motion by the four stay-plates 43 and its longitudinal motion is frictionless and elastic.

As already explained the two supports that take the tension loads from the specimen each receive exactly half of the load and so can be connected to a single weighing chamber, while the supports that receive the compression loads may receive different portions of the load and so each support has its own chamber in the scale, the combined acting area of the two compression chambers being nearly equal to the acting area of the single chamber that is connected with the two supports that receive the tension loads. The acting area of the two receiving supports for the tension loads may be slightly smaller than that of the supports for compression or the acting area of the single weighing chamber connected to the supports for tension loads should be slightly greater than the combined acting area of the other two chambers in such a ratio that equal loads of tension or compression on the specimen give equal loads from the chambers to the load column 42.

The lower end of the load column is connected to the first lever 44 through a fulcrum 45, the short end of this lever resting on the housing casting 41 through the fulcrum 46, the long end of the first lever resting on the second lever 47 through the fulcrum 48. The short end of the second lever rests on the housing casting through fulcrum 49 and its long end rests on the lower end of yoke 50 through fulcrum 51. The third lever 52 is carried above the upper housing casting 53, which is firmly bolted to 41, by fulcrum 54 and the yoke 50 hangs on its short end through fulcrum 55. This lever carries sliding weights for balancing the system and weighing loads coming on the system from the chambers, and also has suspended from it scale pans 56, 57 and 58 on which poise weights may be placed for weighing the loads.

The outer end of the third lever 52 is connected through a fourth lever 59 to a fifth lever 60, the long end of which acts as an indicator to show when the scale is in balance. The fulcrums in this scale might be of the knife edge form usually used but these become inaccurate after a heavy loading or use, giving new acting lengths to the levers and giving friction or they might all be of the "Emery" plate fulcrum type as shown on levers 52, 59 and 60, but under very heavy fulcrum loads these plate fulcrums compress and slip slightly in the portion clamped, which motion causes the scale to be sluggish in returning to exact balance, and to overcome this trouble I prefer, when the fulcrum load is heavy, to use the form of fulcrum shown on levers 44 and 47 and shown to a larger scale in Fig. 16.

The fulcrum 46, see Fig. 16, is formed with a relatively thin central portion connecting two thicker portions or heads, this thin portion giving the fulcrum its flexibility while the large heads spread out the load and decrease its intensity and eliminate motion between the plate and its clamps. One head of this fulcrum 46 is fastened to the lever 44 by screws 61 and 62 which hold it firmly in its seat and eliminate backlash and the other head is held in block 63 by screws 64 in one direction and by clamping block 65 and screws 66 in the other.

The fulcrum 46, see Figs. 7 and 16, connects the lever 44 to the housing casting 41 through block 63 which is held in its seat in the housing by screws 67 and wedge block 68 drawn into place by screws 69. By removing these screws 67 and 69 and driving the wedge block 68 loose in its seat, the block 63 with the lever 44 can be removed from the housing without disturbing the fulcrum 46. In addition to the three scale pans suspended from the third lever, there is one, 70, carried on an extension of the first lever 44, and another, 71, carried on the second lever 47. The weight of the poise weights used on these pans and their leverage referred to the load column is, preferably, so proportioned that the effect of placing one weight on pan 58 is ten times that of placing one weight on pan 57, which in turn is ten times that of placing one weight on pan 56, and so on down. If it is desired to weigh closer than the value of one weight on pan 70 it can be done by the use of sliding weights on the third lever 52 or the unbalanced load, if less than the value of one weight on pan 70 can be estimated by the motion of the indicator over its scale.

The poise weights are put on and off their pans by lowering or raising the poise rods. In Fig. 15 the poise rod 72 is shown provided with a series of shoulders formed by successively increasing its diameter, and the annular weights 73, all of exactly the same weight, have holes and seats of successively increasing diameter to correspond to the shoulders on the poise rod, their thickness and the distance between the corresponding shoulders on the rod being so proportioned that as the rod is lifted the weights are successively transferred from the pan to the rod. The seats are provided with a coned portion to insure the weights being central on the rod and each weight is also provided with coned seats on its upper and lower faces, the seat on the upper face of one corresponding to the seat on the lower face of the one above it to insure their being central when resting on the pan. This poise rod 72 is operated by moving the handle 74 which rotates the hollow shaft 75 which carries an arm 76 provided with gear teeth working with a rack cut on the lower portion of the poise rod 72. The motion of the poise rods for the weights on the other pans is effected in the same manner. The scale when unloaded must be balanced with the weights on the pans 70 and 71 and off the pans 56, 57 and 58, and then to balance and weigh platform loads, weights are removed from the pans 70 and 71 and put on pans 56, 57 and 58. In order to have the handles 77 and 78 move in the same direction as the others for a similar change of load on the scale, the lever system is changed so that while an upward movement of the handle 74 gives a downward motion to the poise rod 72 an upward movement of the handle 77 or 78 gives an upward movement to the poise rods 79 or 80.

As the weights are transferred from the scale pan 56 to the poise rod 72, the load on the rack and the arm 76 is largely increased and to balance the weight of the poise rod, etc. and the increasing load from the weights, a spring is introduced between a fixed support and a head 81 carried by an extension of the arm 76. As the handle 74 is lowered the number of weights carried on the poise rod 72, increases but the acting arm of the spring increases enough faster than the load on the spring decreases so that the increased load on the poise rod is at all times nearly balanced. The lever systems for moving the other poise rods are provided with similar balancing springs.

Having thus described my invention, what I claim as new therein and desire to secure by Letters Patent is:—

1. In a testing machine, the combination of the ways 1, stay plates 7 and 8, and beam 2, fastened to the ways by bolts 3, said beam being channeled to receive the ways and having projections extending longitudinally of the machine from opposite faces of said beam, to which projections the ends of said stay plates are secured.

2. In a testing machine, the combination of the ways 1, stay plates 7 and 8, and the beam 2 made in two main parts fastened to the ways by bolts 3 and nuts 4, the stay plates being fastened to the opposite faces of the beam.

3. In a testing machine, the combination of the ways 1, two pairs of stay plates 7 and 8, the beam 2 made in two main parts fastened to the ways by bolts 3 and nuts 4, with one pair of stay plates fastened to each of two opposite faces of the beam.

4. In a testing machine, the combination of the ways 1, stay plates 7 and 8, and the beam 2, said beam being constructed with two main members each connected to the ways and doweled together with dowel-plates 5.

5. In a testing machine, the combination of the ways 1, and the beam 2 constructed with two main members each firmly secured to the ways and doweled together by dowels 5, said dowels having the form of a double truncated wedge.

6. In a testing machine, the combination of the ways 1 and the beam 2 comprising two main members each firmly secured to the ways and having dowel connection between them; said dowel connection comprising parallel sided opposed seats formed in the beam members, double truncated wedges 5 of polished metal fitting between the parallel sides of said seats, and suitable wedge-shaped pieces 6 interposed between the wedging faces of the dowels and opposed faces of the seats.

7. In a testing machine the combination of the beam 2, the rigidly connected loading platforms 13 and 14 for compression and tension respectively, and hydraulic supports for compression and tension respectively, located on opposite sides of the beam 2 and between said beam and the compression and tension platforms respectively.

8. In a testing machine, the combination of the beam 2, the loading platforms 13 and 14 for compression and tension respectively, rigidly connected by plates 15, and hydraulic supports for compression and tension respectively located on opposite sides of beam 2 and between said beam and the compression and tension platforms respectively.

9. In a testing machine, the combination of the beam 2, the loading platforms 13 and 14 for compression and tension respectively, rigidly connected by top and bottom plates 15 and bolts 17, and hydraulic supports for compression and tension respectively located on opposite sides of beam 2 and between said beam and the compression and tension platforms respectively.

10. In a testing machine, the combination of the beam 2, the loading platforms 13 and 14 for compression and tension respectively, rigidly connected by plates 15, and hydraulic supports for compression and tension respectively located on opposite sides of the beam 2 and between said beam and the compression and tension platforms respectively, said plates being secured to said platforms by wedging clamping joints.

11. In a testing machine, the combination of the loading platforms, and members connecting said platforms; said platforms and members being constructed with a parallel sided projection on one of said pieces extending into a similar but wider parallel sided recess in the other, and having two pairs of wedges between the parallel sides of the projection and recess, and bolts to draw the pieces together and tighten the wedges.

12. In a testing machine, the combination of the loading platforms, and members connecting said platforms; said platforms and members being constructed with a parallel sided projection on one of said pieces extending into a similar but wider parallel sided recess in the other, and having two pairs of wedges between the parallel sides of the projection and recess, one wedge of each pair being of harder material than the other, and bolts to draw the pieces together and tighten the wedges.

13. In a testing machine, the combination of the loading platforms, and members connecting said platforms; said platforms and members being constructed with a parallel sided projection on one of said pieces extending into a similar but wider parallel sided recess in the other, and having two pairs of wedges between the parallel sides of the projection and recess, one wedge of each pair being of harder material than the other and having its inclined face polished, and bolts to draw the pieces together and tighten the wedges.

14. In a testing machine, the combination of rigidly connected compression and tension loading platforms 13 and 14, and the beam 2 located between said platforms and a pair of hydraulic supports located between each of said platforms and the opposed face of the beam.

15. In a testing machine, a hydraulic support constructed with a base 19, pressure column 22, casing ring 20, diaphragm 27 and a bridge ring 28 spanning the space between said column and casing ring, and permitting small relative axial movement between said column and casing ring without changing the form of the cross section of said bridge ring.

16. In a testing machine, a hydraulic support constructed with a base 19, pressure column 22, casing ring 20, diaphragm 27 and a rigid bridge ring 28, resting at its inner edge on the outer edge of the column 22 and at its outer edge on the inner edge of the casing ring 20.

17. In a testing machine, a pressure support constructed with a base 19, pressure column 22, casing ring 20, a thin diaphragm 27 and a bridge ring supporting this diaphragm.

18. In a testing machine, a hydraulic support constructed with a base 19, pressure column 22, casing ring 20, diaphragm 27 and bridge ring 28 spanning the space between said column and casing ring, and permitting small axial movement between said column and casing ring, said bridge ring being relatively thinner at its inner and outer edges and proportionately much thicker at its central part.

19. In a testing machine, a pressure support constructed with a base 19, pressure column 22, casing ring 20, thin diaphragm 27 and a bridge ring supporting this diaphragm, said bridge ring being relatively thin at its inner and outer edges and proportionally much thicker at its central part.

20. In a testing machine, a hydraulic support constructed with a base 19, pressure column 22, casing ring 20, diaphragm 27 and a bridge ring 28, said column and casing ring being constructed with recesses to receive and support the inner and outer edges of the bridge ring respectively.

21. In a testing machine, a hydraulic support constructed with a base 19, diaphragm 27, bridge ring 28, pressure column 22 and casing ring 20, said column and casing being constructed with narrow ledges on their outer and inner edges respectively, on which ledges said bridge ring rests.

22. In a testing machine, a hydraulic support constructed with a base 19, pressure column 22, casing ring 20, diaphragm 27 and a bridge ring 28, resting at its inner and outer edges respectively on the outer edge of said column and inner edge of said casing ring, and having the face next to said diaphragm flush with the faces of the column and casing ring.

23. In a testing machine, a hydraulic support constructed with a base 19, pressure column 22, diaphragm 27 bridge ring 28, bearing ring 32 and a casing ring 20 constructed with a recess to receive the said bearing ring 32.

24. In a testing machine, a hydraulic support constructed with a base 19, casing ring 20, diaphragm 27, bridge ring 28, bearing ring 32$^a$ and pressure column 22, said column being provided with a recess to receive said bearing ring.

25. In a testing machine, a hydraulic support constructed with a base 19, pressure column 22, casing ring 20, diaphragm 27, bridge ring 28 and the bearing rings 32 and 32$^a$ made of hard steel to enable them to properly support the bridge ring 28 on very narrow ledges at its inner and outer edges respectively.

26. In a testing machine, a hydraulic support constructed with a base 19, casing ring 20, column 22, diaphragm 27, and a clamping ring 29 secured to the column by screws 31 to hold the diaphragm in position and prevent leakage between said diaphragm and the column 22.

27. In a testing machine, a hydraulic pressure chamber constructed with a base piece and a pressure diaphragm, together with a pressure column and a casing ring, one of which has a flange supporting the diaphragm and projecting over a large part of the annular space between the said column and casing ring.

28. In a testing machine, a hydraulic pressure chamber constructed with a base 34, pressure column 35, diaphragm 39 and casing ring 36, said casing ring having an inwardly extending flange to support said diaphragm.

29. In a testing machine, a hydraulic pressure chamber constructed with a base 34, pressure column 35, diaphragm 39 and casing ring 36, said casing ring having a flange which covers a large portion of the annular space between the said column and casing ring, said flange having a thickness and width such that the pressure of the liquid in this chamber will cause the inner edge of said flange to spring an amount nearly equal to the distance which the pressure column moves away from the base 34 under the action of said hydraulic pressure.

30. In a testing machine, a hydraulic pressure support constructed with a base 34, diaphragm 39, casing ring 36, and pressure column 35, said column having a flange which projects over a large portion of the space between said column and casing ring.

31. In a testing machine, rigidly connected compression and tension platforms 13 and 14, fixed beam 2, between said compression and tension platforms, a pair of hydraulic load receiving supports arranged on opposite sides of said beam and between it and said platforms, a load column in the weigh case, pressure chambers in the weigh case acting directly against said column, and a pipe leading from one of said load receiving supports to one of said pressure chambers and a pipe from the other support to the other pressure chamber in the weigh case, and liquid in said supports, chambers, and pipes, whereby load from either the compression or tension platform is transmitted to said column in the weigh case.

32. In a testing machine, rigidly connected compression and tension platforms 13 and 14, fixed beam 2 between said platforms, a pair of hydraulic load receiving supports arranged on opposite sides of said beam and between it and said platforms, a load column in the weigh case, pressure chambers in the weigh case acting directly against said column, and a pipe leading from one of said load receiving supports to one of said pressure chambers and a pipe from the other support to the other pressure chamber in the weigh case, and liquid in said supports, chambers and pipes, whereby a load from either of said platforms is transmitted to said column in the weigh case, and the ratio of the acting area of each load receiving support to the acting area of the pressure chamber to which it is connected is such that the same amount of axial load acting against said rigidly connected platforms in either direction will give the same relative load to the column in the weigh case.

33. A testing machine, having a hydraulic support for weighing loads of compression, a hydraulic pressure chamber communicating with said hydraulic support, an independent hydraulic support for weighing loads of tension, a hydraulic pressure chamber independent of the pressure chamber first named, communicating with the hydraulic support for weighing loads of tension, a common load column on which said pressure chambers act, and a common loading means to load the hydraulic supports.

34. A testing machine comprising two sets of independent hydraulic supports one set for weighing compression and the other tension, a load column, and pressure chambers some of which are connected with the tension supports and the remainder, with the compression supports, the chambers connected with either set of supports being symmetrically distributed with reference to the axis of the column.

35. A testing machine constructed with independent hydraulic supports for weighing compression and tension respectively, a housing casting 41, a load transmitting lever 44, a load column 42, independent pressure-chambers located between said load column and said housing, adapted to transmit loads to said column, and pipes connecting said pressure-chambers to said hydraulic supports.

36. In a testing machine, a housing 41 provided with a seat for a pressure chamber, a load lever 44, a load column 42, and a pair of stay plates 43 which hold said load column with its surface parallel with the seat for the pressure chamber; said stay plates preventing the lower end of the column from moving laterally.

37. In a testing machine, a housing 41, a load lever 44, a load column 42, a pair of stay plates 43, which hold said load column in position, and independent removable pressure chambers, for weighing tension and compression respectively, introduced between said housing and load column.

38. In a testing machine, the combination of a weigh lever, a scale pan, a set of weights resting on said scale pan when the scale is balanced without load and removed to balance loads put upon the scale, a rod through which these weights are removed from their scale pan, an operating lever through which said rod is moved, a second weigh lever having a scale pan, a second set of weights to be put upon the scale pan of the second weigh lever to balance loads put upon the scale, a rod for transferring the second set of weights, a second operating lever for moving the last-named rod, and handles for moving the operating levers; the first-named operating-lever handle, in removing the first set of weights from their scale-pan to balance loads put upon the scale, being adapted to move in the same direction as the second-named operating-lever handle moves in putting the second set of weights upon their scale pan to balance loads put upon the scale.

39. In a testing machine, a weigh lever, a scale pan and a series of weights, in combination with a poise rod and operating lever to put said weights on and off the scale, said operating lever being provided with a spring arranged in a manner to balance it and its poise rod and weights, substantially as set forth.

The foregoing specification signed at Washington D. C. this 28th day of January, 1909.

ALBERT H. EMERY.

In presence of—
HERVEY S. KNIGHT,
EDWIN S. CLARKSON.